United States Patent Office 3,360,795
Patented Dec. 26, 1967

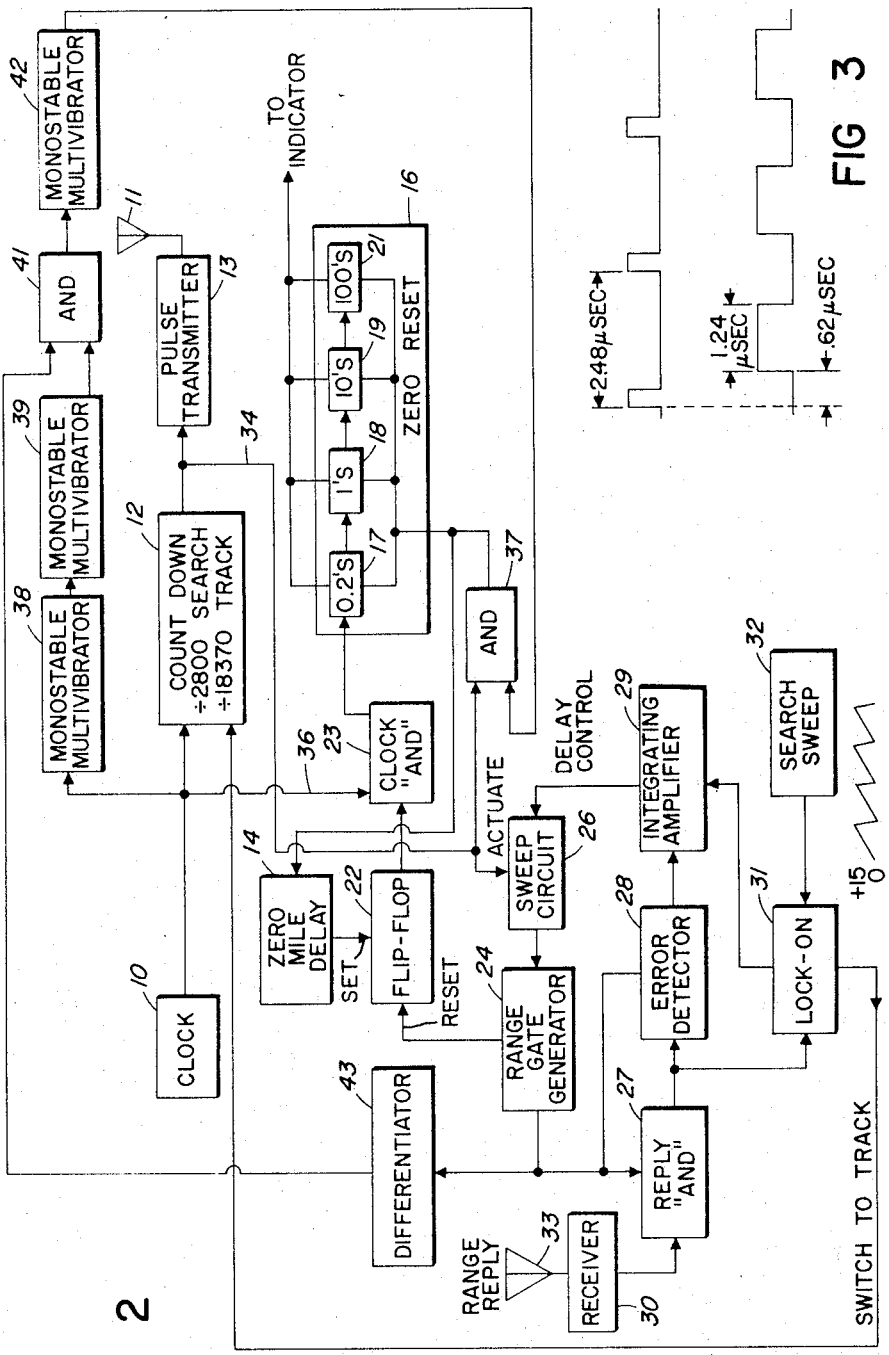

3,360,795
DIGITAL TIME DOMAIN MODE RANGING SYSTEM
Michael W. Lundgreen, Cedar Rapids, and John B. Majerus, Marion, Iowa, assignors to Collins Radio Company, Cedar Rapids, Iowa, a corporation of Iowa
Filed Aug. 19, 1966, Ser. No. 573,590
12 Claims. (Cl. 343—7.3)

This inventioin relates generally to a range finding system and particularly to a digital pulse transmitting system for determining range between two objects.

The need for accurate systems for determining the distance between objects is continually increasing. This need is even more pronounced in aircraft and sea vessels. In an aircraft it is necessary to be able to accurately determine the distance from airports and aircraft carriers. Also aircraft must be able to detect other aircraft at a range sufficient to provide time for taking diversionary action to avoid a collision. The same is true of ships, which must be able to detect one another and also aircraft.

There are various forms of electronic systems for determining the distance between two objects. One of the major difficulties of existing systems is their susceptibility to interference and spurious signals. This susceptibility renders the systems useless, or at least undependable, in many instances when they are most critically needed. Another disadvantage of existing systems is the high power consumption stemming from the continuous transmission of a large number of pulses in each pulse train. The present invention overcomes this disadvantage by modal operation in which a smaller number of pulses is transmitted after a reply signal is received.

The system described herein transmits pulses and measures the time required to receive a return pulse. The return pulse can be either the reflected transmitted pulse or a pulse from a transponder which is initiated by the transmitted pulse. The time requirement is a direct function of the distance between the transmitting and reflecting objects.

The receiving circuitry is weighted so that susceptibility to spurious signals from other sources is minimized and the likelihood of a false reading is thereby minimized. It is therefore an object of this invention to provide a system which accurately determines the range between a transmitting and reflecting or transponding object.

It is another object of this invention to provide such a system which transmits brief pulses at a selected PRF and in which the range is directly readable in digital fashion.

It is another object of this invention to provide such a system which initially searches out a target in a first mode and then automatically switches to a track mode after a target has been located.

It is another object to provide such a system which is accurate and has low susceptibility to interference and spurious signals.

Further objects, features, and advantages of the invention will become apparent from the following description and claims when read in view of the accompanying drawings wherein like numbers indicate like parts and in which:

FIGURE 2 is a block diagram of a second preferred embodiment of the invention which is more complex but which has operational advantages;

FIGURE 3 shows a set of pulse waveforms which are useful in explaining the operation of the embodiment of FIGURE 2.

Figure 1:
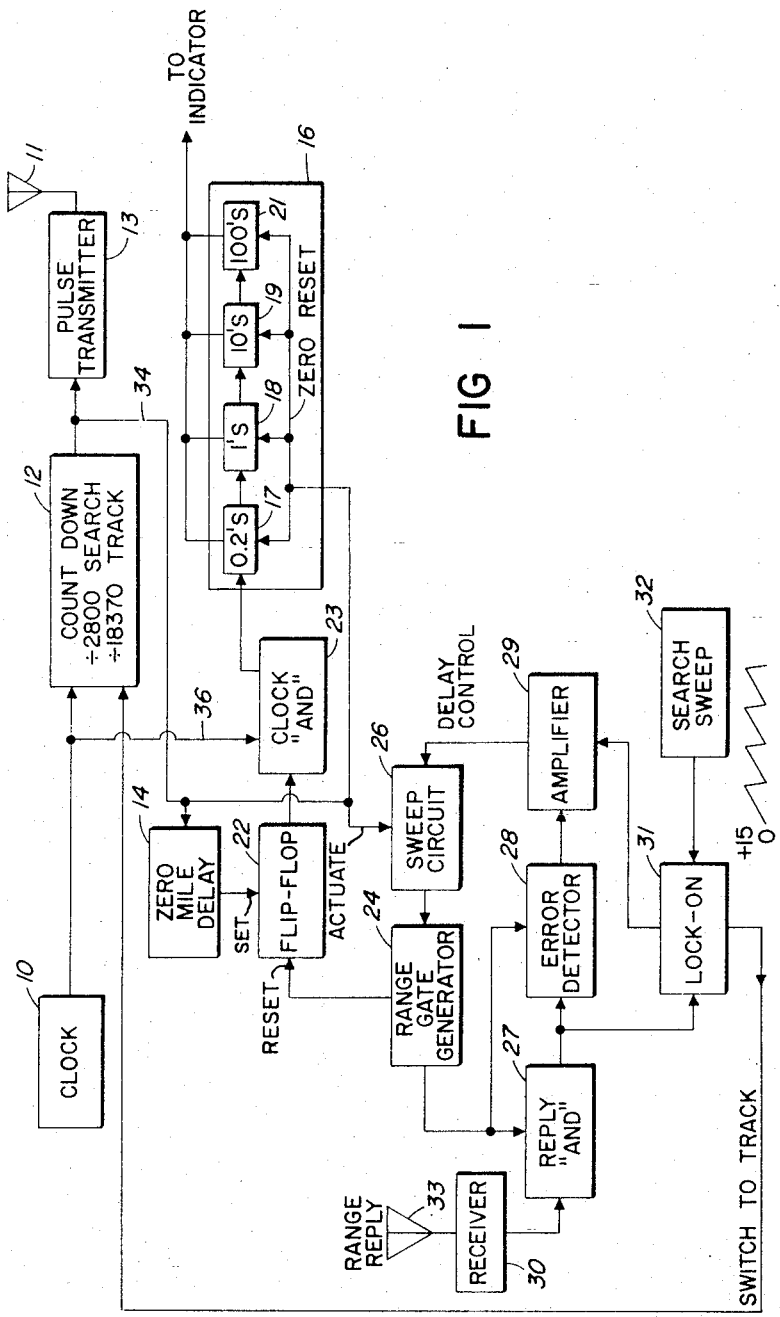
FIGURE 1 shows a block diagram of a preferred embodiment of the invention.

The ranging circuit described herein consists of an interrogation generator, a digital range counter, a range reply tracker and a lock-on circuit. Interrogation pulses initiated by the clock and divided down by a count-down circuit are transmitted to a transponder or a reflecting surface whereupon a reply signal is received back. The delay between interrogation and reply is proportional to range. In a transponder system, a delay due to turn around time in the transponder delays the return signal in addition to the propagaiton delay. The manner of compensating for this additional delay is described hereinafter. The range gate tracks the range reply so that when clock pulses having any range resolution are introduced into the counter, starting at the time of the interrogation and ending at the time of the range gate, a count is derived that is proportional to range. The range between the transmitter and reflecting surface (or transponder) can therefore be determined by observing the count obtained between the interrogation pulse and reply pulse.

As shown in FIGURE 1, the system comprises a Clock 10 the output of which is fed to a Divider Circuit 12 where the clock frequency is divided down by selected amounts to constitute a search and a track mode each having a different PRF. The output of Count-Down circuit 12 is then transmitted by Pulse Transmitter 13. The output of Divider 12 constitutes an interrogation pulse train each pulse of which actuates a Sweep Circuit 26. The Sweep Circuit 26 actuates a Range Gate 24 which generates a range gate pulse. As will be explained hereinafter, coincidence of a range gate pulse and a reply pulse in Reply AND Circuit 27 is indicative of the range between antenna 11 and a reflecting surface, the range being directly readable by the output of Counter 16.

In the system shown the individual blocks constituting separate circuits and performing particular functions are of types well-known in the art and therefore details of the individual circuits employed in the system need not be discussed herein.

In operation a stabilized Clock 10 which, in the instance shown has an output frequency of 404.56 kc., energizes a Dividing Circuit 12. The system has two modes of operation, a search mode and a track mode. In the search mode a range gate sweeps a range limited by the search PRF. In track mode the range gate tracks a target at a lesser track PRF. Divider 12 divides the clock frequency by 2800 in the search mode and therefore the search PRF is 144 p.p.s. In the track mode the clock frequency is divided by 18,370 and therefore the track PRF is 22 p.p.s. Upon initiation of the system the search mode is entered into and each pulse of the interrogation pulse train, which is the output from the Dividing Circuit 12, is fed via line 34 to Sweep Circuit 26 and Zero Mile Delay 14. Sweep circuit 26 is thereby energized by each interrogation pulse. These interrogation pulses also are fed to Counter 16 to reset the counter to zero. The time delay of Zero Mile Delay 14 is initiated by each interrogation pulse and therefore the delay and the interrogation pulse train are synchronized.

A Search Sweep Circuit 32 generates a ramp function varying from 0 to +15 volts, in the example shown. The signal gradually increases from 0 to +15 volts and then rapidly drops to 0. This saw-tooth function is fed through Lock-On Circuit 31 and Integrating Amplifier 29 to Sweep Circuit 26 so that it acts to delay the output of Sweep 26. The output of Sweep Circuit 26 is thereby delayed from zero to a maximum range which could be delayed from zero to a maximum range which could be 240 nautical miles (3000 microseconds) according to the variance in voltage supplied by the Search Sweep Circuit 32. The output of Sweep Circuit 26 is fed to Range Gate Generator 24 which then generates a range gate pulse. The range gate pulse is short in comparison to the interrogation pulse spacing. As an example the range gate can be 40 microseconds, and the interrogation pulse spacing can be 6.95 or 45.4 milliseconds, dependent upon the search and track PRF's. The gate width and pulse spacing can be other values, dependent on parameters such as search speed and nonsynchronous interference pulse density. Any values throughout the specification are exemplary only. Because the output of the Sweep Circuit 26 is delayed anywhere from zero to 3000 microseconds, according to the input from Search Sweep Circuit 32, the position of the range gate pulse varies between the interrogation pulses of successive pulse trains. In this manner the range gate is available from zero to 3000 microseconds following the interrogation pulse and therefore any distance from zero to 240 nautical miles can be measured by the system. The range gate pulse is fed to Reply AND Circuit 27. When no reply pulse is coincident with the range gate pulse the Reply AND Circuit 27 generates no output and therefore the next interrogation pulse will reactuate Sweep Circuit 26 and the search mode will be continued. When a reply pulse is received on antenna 33 and applied to Reply AND Circuit 27 through Receiver 30 at the same time that a range gate pulse is present in Reply AND Circuit 27 an output pulse is generated by Reply AND 27. This pulse is fed to Error Detector 28 and also to Lock-On Circuit 31. Lock-On Circuit 31 is a weighted counter circuit and therefore after a selected number of pulses are received from Reply AND 27 Lock-On 31 will generate an output signal which is fed to Divider 12. This effects a switching operation from the search to the track mode and disconnects the search sweep 32 from Integrating Amplifier 29. The requirement for the application of more than one reply pulse to effect switching of Lock-On 31 minimizes the system's susceptibility to interference and spurious pulses. Lock-On 31 can also be used to provide auxiliary functions such as a flag alarm control to indicate a track condition, or memory to retain the last range reading during the track mode in case reply pulses are lost for a short period of time.

After the system is in the track mode Error Detector 28, Integrating Amplifier 29, Sweep Circuit 26, and Range Gate 24 form a closed loop circuit. The range gate pulse present at the output of Range Gate 24 is fed directly to Error Detector 28. Error Detector 28 therefore compares the range gate pulse with the output from Reply AND 27 and thereby initiates an error signal which shows where within the range gate the reply signal has returned. This error signal supplies a delay voltage through Integrating Amplifier 29 to Sweep Circuit 26 which maintains the range gate pulse accurately centered on the return signal. The integration of the error signal by Integrating Amplifier 29 introduces filtering into the tracking loop and thereby minimizes the time jitter of the range gate in the track mode. Set-Reset Flip-Flop 22 receives a Set input signal from Zero Mile Delay 15 which is built into the system to compensate for the turn around time of the return signal. The delay built into the Zero Mile Delay 14 is equal to transponder delay time (if a transponder is used) and any other fixed delays in the system. A delay multivibrator or a counter can be used to obtain the delay desired. The leading edge of the range gate pulse is fed to the reset input of RS Flip-Flop 22. Flip-Flop 22 therefore changes condition each time a range gate pulse is generated by Range Gate Generator 24. Because each input signal from the Zero Mile delay 14 starts Counter 16 and each range gate pulse stops Counter 16 the clock pulse train is repeated following each interrogation. This capability permits accurate system operation in circumstances where an occasional reply pulse is missing. Reply pulses can occasionally be missed due to transponder inefficiencies or in a reflective system because of weak reply pulses caused by reflecting surfaces discontinuities. In such instances the indicator would jitter and be difficult to read and interpret if the interrogation were not stopped at the end of each period. The stopping of Counter 16 by the range gate pulse eliminates this jitter because the closed loop circuit cannot change significantly when an occasional reply pulse is missing. The system herein disclosed therefore minimizes indicator jitter by the use of a narrow range gate and filtering in the closed loop circuit and also protects against jitter caused by missing pulses by resetting counter 16 with each range gate.

The output from the Zero Mile Delay 14 sets Flip-Flop 22. The output of Flip-Flop 22 enables Clock AND Circuit 23. Pulses from Clock 10 are passed to Clock AND 23 via line 36. These pulses are thereby injected into Counter 16. The leading edge of the range gate pulse resets Flip-Flop 22 which prevents further injection of clock pulses through Clock AND 23 into Counter 16. The number of pulses injected into Counter 16 from Clock 10 is therefore indicative of range. Counter 16 holds the range count until counter 16 is reset to zero by the next pulse from Divider 12. In the example the range counter can be active for as much as 3000 microseconds and stores for the remainder of the interrogation period (45.4 milliseconds). The range counter stores the range count at least 42.4 milliseconds or 93.5% of the time to provide a nonflickering range display.

As explained hereinabove the range gate pulse slides between the interrogation pulses due to the delay generated by search sweep circuit 32 or the error signal derived from error detector 28. There are therefore instances when the range gate pulse and a clock pulse will be very close to time coindence. In such instances the range indication from Count Circuit 16 will jitter one count (0.2 mile in the example) because of small time jitter of the range gate.

FIGURE 2 shows a modification of the FIGURE 1 embodiment in which this jitter is eliminated. The jitter is eliminated by preventing both the resetting of Counter 16 to zero and the starting of an new count in those instances in which the range gate pulse and a clock pulse are in close time proximity. In the FIGURE 1 embodiment Reset to Zero is actuated directly by the divided clock pulses via line 34. In the FIGURE 2 embodiment the Reset to Zero signal is derived from the output of an AND gate 37. One input to AND gate 37 receives the interrogation pulse via line 34 and the second input to AND 37 comes from a Monostable Multivibrator 42. Monostable Multivibrator 42 is actuated when the AND gate 41 receives two inputs. The first input is obtained by actuating series of two Monostable Multivibrators 38 and 39. The second input to AND 41 is obtained from Differentiator 43. The leading edge of the range gate pulse from Range Gate Generator 24 is differentiated by Differentiator 43 to yield a spike. The presence of both the spike and an output from Multivibrator 39 yields an output from AND 41 which, in turn, actuates Multivibrator 42. Assuming the frequency of the output pulse train from Clock 10 is the same as that used as an example hereinabove, the spacing between the clock pulses will be 2.48 microseconds. In order to inhibit the Reset to Zero of Counter 16 and thereby store the previous range indication, the one input of AND 41 is actuated only during the center portion of the period between clock pulses. As shown in FIGURE 3 this is accomplished by injecting the clock pulses into a 0.62 microsecond Multivibrator 38. The output of Multivibrator 38 actuates a 1.24 microsecond Multivibrator 39 and in this manner the output of Monostable Multivibrator 39 is a square wave which is centered within the 2.48 microsecond clock pulse spacing. The 0.62 microsecond periods preceding and following each clock pulse are therefore inactive periods when the output from multivibrator 39 and the output from differentiator 43 are not time coincident. The appearance of a spike from Differentiator 43 in time coincidence with the 1.24 microsecond pulse from Multivibrator 39 yields an output from AND 41 to actuate Monostable Multivibrator 42. The output of Multivibrator 42 actuates the other side of AND 37 which, in turn, actuates the Reset to Zero of Counter 16 and also actuates Zero Mile Delay 14 to initiate Flip-Flop 22 and the Range Gate as described hereinabove with respect to FIGURE 1. In the example herein shown Multivibrator 42 has a period such as 50 miliseconds which exceeds the time between interrogation pulses. The length of the period of Multivibrator 42 is chosen such that an input is present at AND 37 at the end of one interrogation period so that the count can be repeated after each instance in which the leading edge of the range gate pulse falls inside the center portion of the clock pulse period.

Because the previous count is stored when the leading edge of the range gate pulse is close in time to a clock pulse, Counter 16 will continue to indicate the last range during the storage period. Not updating the range indication each interrogation period is not objectionable and does not render an appreciable range error if range is changing at a rate not in excess of that which allows several range gate spikes to occur within each clock pulse period during successive interrogations.

Altough this invention has been described with respect to particular embodiments thereof, it is not to be so limited, as changes and modifications may be made therein which are within the spirit and scope of the invention as defined by the appended claims.

We claim:

1. A digital range system comprising: pulse generating means; dividing means for dividing the output pulse repetition frequency of said pulse generating means into a first pulse repetition frequency for operation in a first mode and a second pulse repetition frequency for operation in a second mode; transmission means for selectively transmitting said first and second pulse repetition frequencies; reception means for receiving the return signal of the pulse repetition frequency being transmitted as a reply pulse; means for generating a range gate pulse; said reception means receiving said range gate pulse to produce a range signal when said range gate pulse and said reply pulse are simultaneously present in said reception means; switching means responsive to a plurality of said range signals to switch said dividing means from said first mode to said second mode after a selected number of said reply pulses has been received in said reception means; error detector means for receiving said range signal and generating an error signal in response to said range signal; and first sweep means for delaying the generation of said range gate pulse in response to said error signal; second sweep means for activating said first sweep means through said switching means so that said first sweep means varyingly delays the generation of said range gate pulse; the output of said second sweep means being a linearly varying, repetitive signal; means for counting the number of pulses in said output pulse repetition frequency; said counter means being deactivated when said range signal is present so that the number of pulses counted in said output pulse repetition frequency is indicative of the distance traveled by said reply pulse.

2. The system of claim 1 including means for holding said means for counting inactive when said range gate pulse is in closed time proximity to a pulse of said output pulse repetition frequency.

3. The system of claim 1 wherein said first pulse repetition frequency is greater than said second pulse repetition frequency.

4. The system of claim 1 wherein the time duration of said range gate pulse is much less than the time spacing of successive pulses in said first and second pulse repetition frequencies.

5. The system of claim 1 including means for integrating the input to said first sweep means.

6. The system of claim 1 wherein the output of said dividing means is fed to a reset to zero input of said means for counting.

7. The system of claim 6 wherein the activation of said means for counting is delayed by a preset delay period to compensate for fixed delays known to affect the system.

8. The system of claim 1 wherein the time duration of said range gate pulse is much less than the time spacing of successive pulses in said first and second pulse repetition frequencies.

9. The system of claim 8 wherein the output of said second sweep means is a saw-tooth waveform so that the varying delay of said range gate generator causes the position of said range gate pulse to vary between successive pulses of the pulse repetition frequency being transmitted.

10. A digital ranging system comprising: pulse generating means; dividing means for dividing the output pulse repetition frequency of said pulse generating means into a first pulse repetition freqency for operation in a first mode and a second pulse repetition frequency for operation in a second mode; transmission means for selectively transmitting said first and second pulse repetition frequencies; reception means for receiving the return of the pulse repetition frequency being transmitted as a reply pulse; means for generating a range gate pulse; said reception means receiving said range gate pulse to produce a range signal when said range gate pulse and said reply pulse are simultaneously present in said reception means; switching means responsive to a plurality of said range signals to switch said dividing means from said first mode to said second mode af.er a selected number of said reply pulses has been received in said reception means; error detector means for receiving said range signal and generating an error signal in response to said range signal; and first sweep means for delaying the generation of said range gate pulse in response to said error signal; means for integrating the input to said first sweep means; means for counting the number of pulses in said output pulse repetition frequency; said counter means being deactivated when said range signal is present so that the number of pulses counted in said output pulse repetition frequency is indicative of the distance traveled by said reply pulse.

11. A digital ranging system comprising: pulse generating means; dividing means for dividing the output pulse repetition frequency of said pulse generating means into a first pulse repetition frequency for operation in a first mode and a second pulse repetition frequency for operation in a second mode; transmission means for selectively transmitting said first and second pulse repetition frequencies; reception means for receiving the return signal of the pulse repetition frequency being transmitted as a reply pulse; means for generating a range gate pulse; said reception means receiving said range gate pulse to produce a range signal when said range gate pulse and said reply pulse are simultaneously present in said reception means; switching means responsive to a plurality of said range signals to switch said dividing means from said first mode to said second mode after a selected number of said reply pulses has been received in said reception means; means for counting the number of pulses in said output pulse repetition frequency; means for holding said means for counting inactive when said range gate pulse is in close time proximity to a pulse of said output pulse repetition frequency; said counter means being deactivated when said range signal is present so that the number of pulses counted in said output pulse repetition frequency is indicative of the distance traveled by said reply pulse.

12. The system of claim 11 wherein said means for holding comprises: a first multivibrator having a period equal to one-fourth the spacing between the pulses of said output frequency, a second multivibrator having a period equal to one-half the spacing between the pulses of said output frequency, said second multivibraotr receiving the output of said first multivibrator, a differentiator for differentiating said range gate pulse to form a spike, a first AND gate receiving said spike and the output of said second multivibrator, a third multivibrator receiving the output of said first AND gate, and a second AND gate receiving the output of said dividing means and said third multivibrator.

References Cited

UNITED STATES PATENTS

| | | | |
|---|---|---|---|
| 3,035,263 | 5/1962 | Lader et al. | 343—7.3 |
| 3,246,325 | 4/1966 | Sofen et al. | 343—7.3 |

FOREIGN PATENTS 684,824  4/1964  Canada.

RODNEY D. BENNETT, *Primary Examiner.*

D. C. KAUFMAN, *Assistant Examiner.*